United States Patent
Vollkommer et al.

(10) Patent No.: US 7,471,776 B2
(45) Date of Patent: Dec. 30, 2008

(54) SYSTEM AND METHOD FOR COMMUNICATION WITH AN INTERACTIVE VOICE RESPONSE SYSTEM

(75) Inventors: Richard M. Vollkommer, Smithtown, NY (US); Bruce A. Willins, East Northport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 219 days.

(21) Appl. No.: 10/853,912

(22) Filed: May 26, 2004

(65) Prior Publication Data

US 2005/0265524 A1 Dec. 1, 2005

(51) Int. Cl.
*H04M 11/06* (2006.01)

(52) U.S. Cl. ............... 379/88.18; 379/88.01; 455/563; 704/212

(58) Field of Classification Search ............ 379/88.03, 379/88.01, 207.02, 88.18; 455/563; 381/314; 704/212

See application file for complete search history.

(56) References Cited

U.S. PATENT DOCUMENTS

| | | | | |
|---|---|---|---|---|
| 5,719,921 | A * | 2/1998 | Vysotsky et al. | 379/88.01 |
| 6,529,747 | B1 * | 3/2003 | Toba | 455/563 |
| 6,594,347 | B1 * | 7/2003 | Calder et al. | 379/88.01 |
| 6,744,860 | B1 * | 6/2004 | Schrage | 379/88.03 |
| 6,816,599 | B2 * | 11/2004 | Thiede et al. | 381/314 |
| 6,947,537 | B2 * | 9/2005 | Pershan | 379/207.02 |
| 7,107,208 | B2 * | 9/2006 | Cho et al. | 704/212 |

* cited by examiner

*Primary Examiner*—Gerald Gauthier
(74) *Attorney, Agent, or Firm*—Fay Kaplun & Marcin, LLP

(57) ABSTRACT

Described is a system and method for communicating using a telecommunications device which includes an automatic speech recognition (ASR) system. The ASR system which is capable of recognizing at least one prestored command from a voice input to the telecommunication device is activated. The ASR system compares the voice input to the at least one prestored command. When at least a first portion of the voice input matches the prestored command, the ASR system reviews a second portion of the voice input to determine a parameter value. A tone system generates a tone frequency corresponding to the parameter value.

19 Claims, 2 Drawing Sheets

SYSTEM AND METHOD FOR COMMUNICATION WITH AN INTERACTIVE VOICE RESPONSE SYSTEM

BACKGROUND ART

Interactive voice response (IVR) systems are automated phone response devices that communicate with a caller using a plurality of prerecorded messages. These systems store the messages in a directory structure as options and list menu options with corresponding numbers (e.g., "To reach technical support, press 5"). After hearing the menu options, the caller then inputs a corresponding number on the phone's keypad after which the caller is then directed to an operator or generally another menu where the IVR system lists a new set of options. Furthermore, these systems only work with touch tone phones because these phones can emit a frequency that can be easily interpreted by the IVR systems, unlike the pulse phones.

Recently, a few of the major IVR systems (e.g., UPS's auto response system) have been updated to include automated speech recognition (ASR) systems which interpret a caller's speech. Therefore, instead of pressing a corresponding number key to access a menu option, a caller may simply say the corresponding number. These IVR-based ASR systems are very complicated as they are required to interpret an enormous amount of pronunciations of corresponding numbers. The complexity of the ASR systems makes them too cost-prohibitive to be widely implemented, thus, most IVR systems still require their callers still to input selections using a keypad.

The reliance on keypad input is especially problematic in the context of cellular phones. Many state and municipal governments have introduced laws banning cellular phone usage while driving. Compliance with the law requires the callers to use "hands free devices" (e.g., headsets and speakerphones). Often these modules are also supplemented by internal ASR systems. Some phones allow a caller to dial a stored number by simply stating the name of the person. However, when a caller is communicating with an IVR system, the internal ASR system is of little use as the caller would still have to input responses to IVR options using the keypad. Therefore, there is a need for a local ASR system that would allow a caller to communicate with an IVR system using voice commands.

SUMMARY OF THE INVENTION

The present invention relates to a system and method for communicating using a telecommunications device which includes an automatic speech recognition (ASR) system. The ASR system which is capable of recognizing at least one prestored command from a voice input to the telecommunication device is activated. The ASR system compares the voice input to the at least one prestored command. When at least a first portion of the voice input matches the prestored command, the ASR system reviews a second portion of the voice input to determine a parameter value. A tone system generates a tone frequency corresponding to the parameter value.

DETAILED DESCRIPTION

Figure 1:
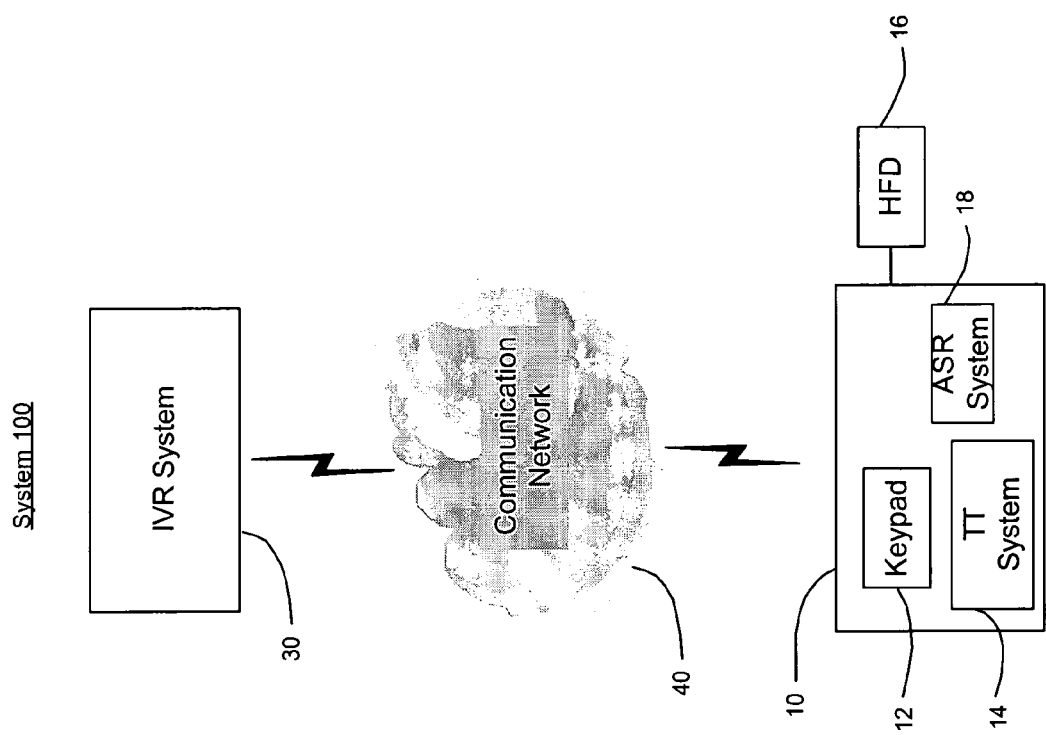
FIG. 1 shows an exemplary embodiment according to the present invention of a telecommunication device communicating with an interactive voice response (IVR) system.

FIG. 1 shows an exemplary embodiment of a system 100 which allows a caller to communicate with an interactive voice response (IVR) system 30 using a voice input. The system 100 may include a telecommunication device (TCD) 10 which may be a two-way radio, an alpha-numeric device (e.g., BlackBerry™), a telephone, adapted for either land line or wireless networks. The TCD 10 may include a keypad 12 which may be used by a caller to input data into the TCD 10 (e.g., phone numbers or responses to the menu options listed by the IVR system 30). The TCD 10 may also include a touch tone (TT) system 14 which works in conjunction with the keypad 12. This TT system 14 is responsible for generating touch tone frequencies (e.g., dual-tone multiple frequencies "DTMF") that are used by the modern telephone networks to dial phone numbers and communicate responses to menu options of the IVR system 30. In addition, the TCD 10 contains an automatic speech recognition (ASR) system 18. The ASR system 18 converts the voice input into a corresponding command and/or a parameter. A hands-free device 16 (e.g., a speakerphone, a headset) may be attached to the TCD 10 for the voice input.

When activated, the ASR system 18 monitors the voice input obtained through the HFD 16 or the TCD 10. While the ASR system 18 may always be active, a continuous operation may be problematic because it requires continuous power consumption, as well as use of hardware and software components of the TCD 10 which are very limited. Therefore, it is preferred that the status of the ASR system 18 may be toggled by the caller so that the ASR system 18 is only active when the caller needs it to be. In addition, during the continuous operation, the ASR system 18 may produce false recognition results or interpret regular conversation as commands/parameters, thereby triggering undesired corresponding actions by the TCD 10. In one exemplary embodiment of the present invention, the activation and deactivation of the ASR system 18 may be accomplished by including a switch or a button on the TCD 10 or on the HFD 16.

After the ASR system 18 receives the voice input from the caller, the ASR system 18 compares it to prestored commands included in a vocabulary and finds a corresponding command. In particular, the voice input received by the ASR system 10 is analyzed to determine if there is a match to the prestored commands stored in the vocabulary. The vocabulary may be loaded into the TCD 10 when the ASR system 18 is activated. In particular, the vocabulary contains a listing of commands that are associated with specific functions/actions. For instance, if the TCD 10 can store a voice activated phone book the vocabulary may contain a command "phone book." Thus, if the caller speaks "phone book," the ASR system 18 recognizes the command and activates the phone book function of the TCD 10.

The ASR system 18 may also utilizes a multi-level vocabulary which includes, e.g., a first vocabulary and a second vocabulary. The first vocabulary may store primary commands, while the second vocabulary may store secondary commands associated with a particular primary command of the first vocabulary. Continuing with the phone book example, after the phone book is activated by the TCD 10, the caller may speak secondary commands related to this operation, such as the names of the places the caller wishes to call (e.g., Pizzeria, Parents, etc.). To deactivate the ASR system 18, the caller may speak a word recognized by the limited vocabulary that signals termination (e.g., "end") or turn off the ASR system 18 or the TCD 10 itself.

The vocabulary may include a command "tone". Upon receiving the voice input which includes the command "tone," the ASR system 18 extracts parameter value which follow in the voice input the command "tone". The value of the parameter may describe major keys of the keypad 12 (e.g., one, two, three, four, pound, star, etc.). In exemplary embodiment according to the present invention, other keys, such as an English alphabet instead of only numbers (e.g., if the TCD 10 is a device having an alpha-numeric input) can be included in the keypad 12 and recognized by the ASR system 18.

Once the voice input (e.g., "tone five") is received and recognized by the AST system 18, the TT system 14 generates the corresponding DTMF which is transmitted to the IVR system 30. The TCD 10 may communicate with the IVR system 30 using communication network 40 (e.g., a land lines network, a wireless network, the Internet) depending on the nature of the TCD 10 and the network 40. The IVR system 30 may be any automated voice response system that includes menus and allows the caller to respond using a touch tone keypad (e.g., the keypad 12).

Figure 2:
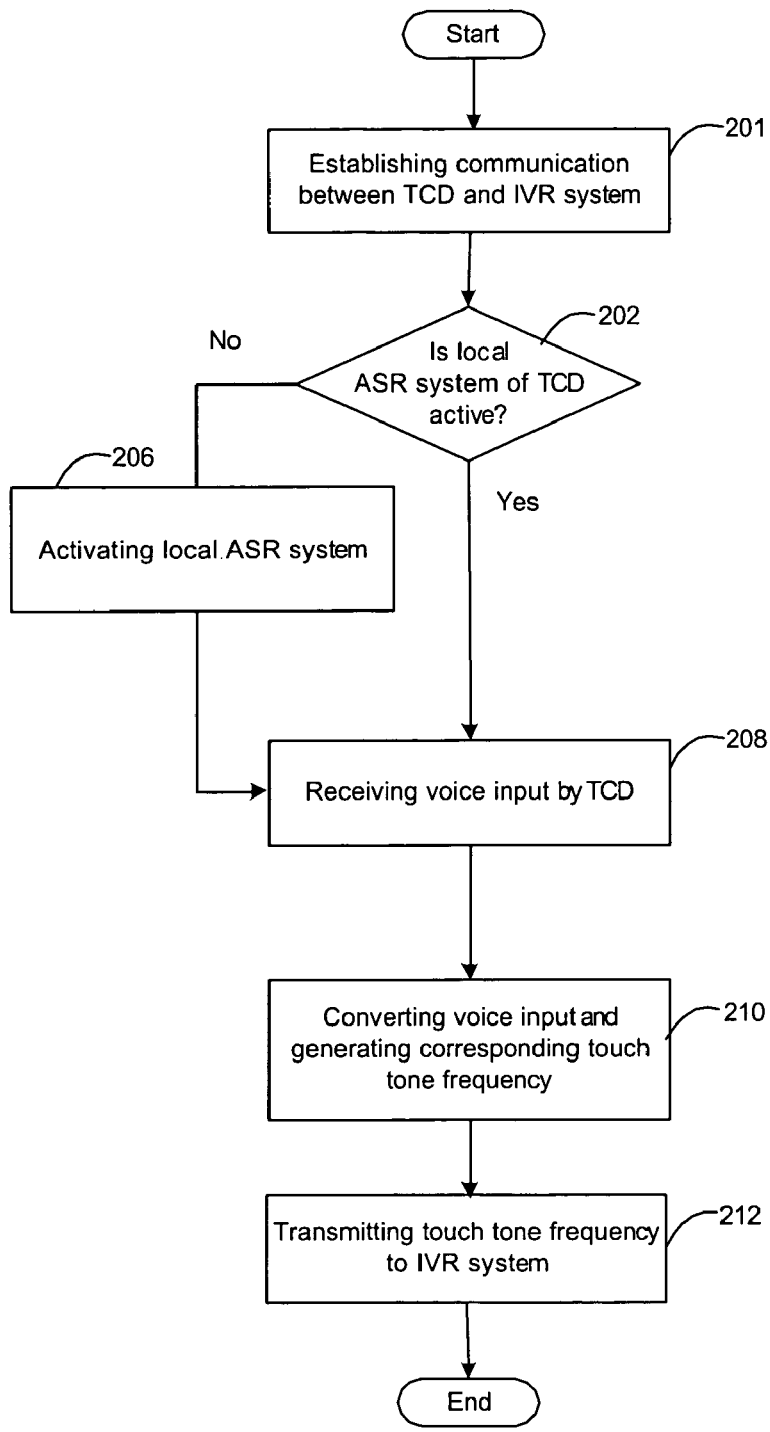
FIG. 2 shows an exemplary embodiment of a method employing a local automatic speech recognition (ASR) system to communicate with the IVR system.

FIG. 2 shows an exemplary embodiment according to the present invention of a method employing the ASR system 18 to communicate with the IVR system 30. In step 201, the caller initiates a call which is answered by the IVR 30. In particular, the caller dials the corresponding number using the keypad 10 or using an exemplary "phone book" voice recognition dialing method discussed above. In another exemplary embodiment of the present invention, the call may be initiated by the IVR system 30 or any third party.

Once the TCD 10 is connected to the IVR system 30, the IVR system 30 may pose a plurality of inquiries to the caller directing him to enter certain keys corresponding to menu options. Therefore, the ASR system 18 needs to be activated so that it is ready to accept a voice input from the caller. In step 202, a determination is made as to whether the ASR system 18 is activated.

If the ASR system 18 is not activated, then the ASR 18 is activated with the intervention of the caller. For example, the caller may activate the ASR system 18 by pressing a specified switch or button located on the HFD 16 or the TCD 10. Upon activation of the ASR system 18, the vocabulary is loaded and the ASR system 18 is ready to recognize any of the prestored commands contained in the vocabulary. Those skilled in the art would understand that there are other methods of activating the ASR system 18.

In step 210, the voice input is received by the TCD 10 via the HFD 16. The voice input is analyzed by the ASR system 18 to determine if a first portion of the voice input matches to one of the prestored commands stored in the vocabulary. If it does, then the ASR system 18 reviews a second portion of the voice input to determine one of more parameter values. For instance, upon hearing a prompt from the IVR system 30 to press "5", the caller says "Tone five." In this example, the voice input is "Tone 5;" thus, the first portion is "Tone" which matches to the prestored command of the vocabulary and the second portion is "5" which is the parameter value.

In an alternative exemplary embodiment of the present invention, the ASR system 18 may accept as an input a continuous parameter values. The caller may use a predetermined voice input to indicate a staring point of the continuous parameter values input (e.g., "tone start"). During the continuous parameter value input, the caller provided any number of parameter values in response the IVR system 30 until a voice input which matched to an ending point is provided (e.g., "tone end"). This exemplary embodiment is particularly useful when the IVR system 30 requires the caller to provide a number of responses (e.g., account number, social security number, etc.).

Upon receiving the command and the parameter values from the ASR system 18 (step 212), the TT system 14 generates the corresponding touch tone frequency. For example, upon receiving an voice input "tone five," the TT system 14 generates a tone frequency which is identical to pressing the button "5." In step 214, the corresponding tone frequency is transmitted to the IVR system 30, thus, satisfying its query.

As discussed earlier, an ability to accept spoken number entry is vital to cell phone users that are preoccupied by other activities, such as driving, using a computer, etc. The present invention allows the callers to concentrate on other tasks, without removing their attention or hands to operate a telephone. In addition, the present invention may also be implemented in devices other than telecommunication devices. It may be useful in other portable electronic devices that rely on conventional input methods, such a keypad. For instance, a voice input system may also be included into a handheld scanner (e.g., barcode scanner).

What is claimed is:

1. A method for communicating using a mobile telecommunication device which includes an automatic speech recognition (ASR) system, comprising the steps of:
   selectively activating the ASR system which is capable of recognizing at least one prestored command from a voice input to the telecommunication device;
   comparing, with the ASR system, the voice input to the at least one prestored command, wherein, when at least a first portion of the voice input matches the prestored command, the ASR system reviews a second portion of the voice input to determine a parameter value; and
   generating a DTMF tone frequency corresponding to the parameter value.

2. The method according to claim 1, wherein the device includes a keypad, and wherein the parameter value corresponding to a character of the keypad.

3. The method according to claim 1, wherein the tone frequency is generated by a DTMF tone generator of the device.

4. The method according to claim 1, wherein the activating step is a predetermined button is pressed.

5. The method according to claim 1, further comprising the steps of:
   establishing a communication with an interactive voice response (IVR) system;
   receiving an input request from the IVR system; and
   transmitting the tone frequency to the IVR system in response to the request.

6. The method according to claim 1, further comprising the step of:
   after the activating step, loading a vocabulary of the ASR system into a memory of the device, the vocabulary including the at least one prestored command.

7. The method according to claim 1, wherein the second portion continues until a third portion is received, the third portion matching to at least one of a further prestored command and a further parameter.

8. The method according to claim 1, wherein the telecommunication device includes at least one of a telephone, a two-way radio, a mobile scanner, and a two-way alpha-numeric pager.

9. The method according to claim 1, further comprising the step of:

receiving the voice input via a hands-free device which is coupled to the telecommunication device.

10. A mobile telecommunication device, comprising:
an input arrangement receiving a voice input from a user;
an automatic speech recognition (ASR) system capable of recognizing at least one prestored command from the voice input, the ASR system being selectively activated by the user; and
a tone system,
wherein the user activates the ASR system, the ASR system comparing the voice input to the at least one prestored command, wherein, when at least a first portion of the voice input matches the at least one prestored command, the ASR system reviews a second portion of the voice input to determine a parameter value, the tone system generating a DTMF tone frequency corresponding to the parameter value.

11. The device according to claim 10, wherein the device is attached to a hands-free device, the input arrangement receiving the voice input via the hands-free device.

12. The device according to claim 11, wherein the hands-free device is at least one of a speakerphone and a headset.

13. The device according to claim 10, wherein the ASR system is selectively activated when a predetermined button is pressed.

14. The device according to claim 10, wherein a communication with an interactive voice response (IVR) system which transmits a request for input and wherein the tone frequency is transmitted to the IVR system in response to the request.

15. The device according to claim 10, wherein the telecommunication device is at least one of a telephone, a two-way radio, a mobile scanner, and a two-way alpha-numeric pager.

16. The device according to claim 10, further comprising:
a keypad, wherein the parameter value corresponding to a character of the keypad.

17. The device according to claim 10, wherein the tone frequency is generated by a DTMF tone generator.

18. A method for communicating with an interactive Voice response (IVR) system, comprising the steps of:
establishing a communication with the IVR system using a mobile telecommunication device, the device including an automatic speech recognition (ASR) system and a keypad, the ASR system being selectively activated by a user;
when the ASR system is activated, loading a vocabulary of the ASR system which includes at least one predetermined voice command;
using the ASR system, recognizing a first portion of a voice input as the at least one predetermined voice command and determining at least one character of the keypad in a second portion of the voice input;
generating a DTMF tone frequency associated with activation of the respective keypad character; and
transmitting the tone frequency to the interactive voice response system.

19. A system for communication with an interactive voice response (IVR) system, comprising:
a hands-free arrangement; and
a mobile telecommunication device receiving a voice input via the hands-free arrangement and capable of establishing a communication with the IVR system, the device including a keypad, an automatic speech recognition (ASR) system and a tone system, the ASR system being selectively activated by a user,
wherein when the ASR is activated, a vocabulary including at least one predetermined voice command is loaded, the ASR system recognizing a first portion of a voice input as the at least one predetermined voice command and converts a second portion into at least one character of the keypad,
wherein the tone system generates a DTMF tone frequency associated with activation of the respective keypad character, the device transmits the tone frequency to the IVR system.

* * * * *